(12) United States Patent
Winkelmann et al.

(10) Patent No.: US 9,752,682 B2
(45) Date of Patent: Sep. 5, 2017

(54) COMPOUND BACK-UP RING FOR O-RING/BACK-UP RING SEALING SYSTEMS IN 70 MPA HYDROGEN STORAGE SYSTEMS

(75) Inventors: Holger Winkelmann, Wiesbaden (DE); Stefan Slavik, Ober-Olm (DE)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 13/606,150

(22) Filed: Sep. 7, 2012

(65) Prior Publication Data

US 2014/0070494 A1  Mar. 13, 2014

(51) Int. Cl.
*F16J 15/06* (2006.01)
*F16J 15/16* (2006.01)
*H01M 8/04082* (2016.01)

(52) U.S. Cl.
CPC ....... *F16J 15/166* (2013.01); *F17C 2209/234* (2013.01); *F17C 2221/012* (2013.01); *F17C 2223/0123* (2013.01); *F17C 2223/036* (2013.01); *F17C 2260/036* (2013.01); *F17C 2270/0184* (2013.01); *F17C 2270/0763* (2013.01); *H01M 8/04208* (2013.01); *H01M 2250/20* (2013.01); *Y02E 60/321* (2013.01); *Y02T 90/32* (2013.01)

(58) Field of Classification Search
CPC ............... F16J 12/00; F16J 15/06; F16J 15/10
USPC .............. 220/581–592, 4.12–4.17, 615–621, 220/682–691; 277/628, 630, 637
See application file for complete search history.

(56) References Cited

U.S. PATENT DOCUMENTS

| | | | | |
|---|---|---|---|---|
| 3,854,735 | A * | 12/1974 | Maurer | F16J 15/166 277/638 |
| 5,071,318 | A * | 12/1991 | Bice et al. | 415/230 |
| 6,173,960 | B1 * | 1/2001 | Inose et al. | 277/347 |
| 6,173,968 | B1 * | 1/2001 | Nelson | F16J 15/166 277/584 |
| 7,971,852 | B2 * | 7/2011 | Otsubo et al. | 251/144 |
| 2003/0122322 | A1 * | 7/2003 | Tremoulet et al. | 277/630 |
| 2008/0111322 | A1 | 5/2008 | Otsubo et al. | |
| 2010/0112398 | A1 * | 5/2010 | Imamura | H01M 8/04156 429/430 |
| 2013/0299504 | A1 * | 11/2013 | Koppert et al. | 220/586 |

\* cited by examiner

*Primary Examiner* — Vishal Patel
*Assistant Examiner* — Thomas Neubauer
(74) *Attorney, Agent, or Firm* — Quinn IP Law

(57) ABSTRACT

O-ring/back-up ring systems that are suitable for use in high pressure applications, including those of 70 MPa automotive hydrogen storage applications, to form a seal between first and second connector bodies. Such sealing systems comprise a back-up ring having a base portion and a flange portion, wherein such ring is configured to prevent extrusion of an O-ring into a gap existing between the back-up ring and a groove into which the back-up ring and O-ring are disposed. High pressure gas storage systems comprising such sealing systems, and methods of sealing a connection in a high pressure hydrogen storage system using such sealing systems.

16 Claims, 3 Drawing Sheets

COMPOUND BACK-UP RING FOR O-RING/BACK-UP RING SEALING SYSTEMS IN 70 MPA HYDROGEN STORAGE SYSTEMS

FIELD

This application relates to sealing of high-pressure systems, and more particularly to improved O-ring/back-up ring sealing systems for high-pressure hydrogen storage systems.

BACKGROUND

Fuel cells produce electrical energy by processing first and second reactants. Typically, this is through oxidation of hydrogen and reduction of oxygen. Because a plurality of fuel cells, when configured into a "stack," can provide suitable voltage for powering a vehicle, there is an ongoing need for improved ways to provide reactants to automotive fuel cells.

High pressure hydrogen storage systems are one way of meeting this need. In such systems, hydrogen gas is compressed to 35 MPa (350 bar/5,000 psi) or 70 MPa (700 bar/10,000 psi) and stored in steel or lightweight composite tanks. While a variety of storage systems for gases are known (for example, medical gases, industrial gases, natural gas, and scuba tanks), high pressure hydrogen storage systems for automotive applications have challenges. For example, such systems must have components—regulators, sensors, couplings, valves, fuel lines, tanks, connectors, and sealing systems therefore—that operate under high pressure, low temperatures, high temperatures, corrosive conditions (storage is typically under the vehicle body), and over a long lifetime. Additionally, components of an automotive application must fit into a relatively limited space, so clearances between components are tight and replacement can be difficult. Moreover, because such systems are in vehicles, components must be reliably resistant to leakage of high pressure gaseous fuels.

One way to help manage leakage of high pressure gases is through the use of O-rings. An O-ring is typically an elastomeric material set into a groove formed within a first connector body (such as a cylinder surface) and compressed between the first connector body and a surface of a second connector body (such as an inner surface of a housing). The compression and the acting pressure deform the O-ring and create a seal between the first and second connector bodies. However, pressure forces acting upon the O-ring can cause its extrusion into gaps existing between the first and second connector bodies. Such gaps are primarily generated by manufacturing tolerances and design requirements, and the degree of extrusion is a function of O-ring hardness, clearance of mating parts, fluid/gas pressure, and temperature.

Because O-ring extrusion is a common cause of seal failure in pressurized systems, a back-up ring made of a relatively stiff material is typically also inserted into the groove of the first connector body. The back-up ring is typically installed at a portion of the groove opposite the source of pressure, and the O-ring is installed adjacent thereto, closest to the source of pressure. In such a configuration, pressure acts upon the O-ring, which exerts force on the back-up ring and causes it to extend past the edge of the groove and contact the second connector body, thereby bridging gaps between the first and second connector bodies and preventing extrusion of the O-ring into such gaps. In most applications, conventional back-up rings can allow for relatively large manufacturing tolerances between the mating surfaces of the first and second connector bodies because such rings bridges the gap between the mating parts Conventional back-up rings are available in solid (uncut), single turn (scarf cut), and multi-turn (spiral cut) configurations, and examples of where such back-up rings are typically used include fitting-to-fitting connections, fitting-to-housing connections, pipe-to-fitting connections, and valve applications (such as valve shuttles, piston seals, valve seats, and valve housings).

High pressure hydrogen storage systems for automotive applications, and in particular for 70 MPa systems, are a relatively new technology in which the discovery of a variety of unique issues and challenges is ongoing during development. Among them is the discovery that conventional O-ring/back-up ring systems widely used in lower pressure applications and in industrial high-pressure applications are susceptible to failure in 70 MPa automotive applications. Such failure can arise due to O-ring extrusion into gaps existing between a conventional back-up ring and the inner circumference of a groove of a connector body (i.e., a gap within the groove itself rather than between the first and second connector bodies). This gap is determined by, among other things, the manufacturing tolerances of the connector body diameter, inner groove diameter, and back-up ring width. O-ring extrusion of this type is not an issue encountered in industrial high pressure applications where the ratio of seal area and gap size is comparatively large as compared to that in automotive applications. O-ring extrusion of this type is also not an issue encountered in lower pressure applications, where wider manufacturing tolerances are acceptable.

In light of the aforementioned, there exists a need for new ways of sealing between two connector bodies, including those of high pressure automotive systems. More particularly, there is a demonstrated need for O-ring/back-up ring sealing systems that overcome the shortcomings of the prior art.

SUMMARY

The present application discloses O-ring/back-up ring sealing systems that are suitable for use in high pressure applications, including high pressure automotive applications. Among the various embodiments contained within the present disclosure are a back-up ring for use with an O-ring to form a seal between first and second connector bodies; a high pressure gas storage system comprising such provided O-ring/back-up ring sealing system; and a method of sealing a connection in a high pressure hydrogen storage system using such provided O-ring/back-up ring sealing system.

The back-up ring disclosed herein comprises a base portion and a flange portion, wherein the flange portion is configured to engage the O-ring. Unlike conventional back-up rings, the provided back-up ring is configured to prevent extrusion of the O-ring into gaps that may exist between first and second connector bodies, as well as to prevent extrusion of the O-ring into gaps that may exist between the back-up ring and the groove into which the back-up ring and O-ring are disposed. Because it is designed to prevent two types of O-ring extrusion, the provided back-up ring is suitable for preventing, or at least reducing, the types of O-ring wear encountered in 70 MPa automotive hydrogen storage systems. Accordingly, also provided are improved hydrogen storage systems and vehicles comprising such improved systems.

BRIEF DESCRIPTION OF THE DRAWINGS

A more complete appreciation of the present disclosure and the many embodiments thereof will be readily obtained as the same becomes better understood by reference to the following detailed description when considered in connection with the accompanying drawings, wherein.

DETAILED DESCRIPTION

Specific embodiments of the present disclosure will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

In various embodiments, the present disclosure provides a back-up ring for use with an O-ring to form a seal between first and second connector bodies, a high pressure gas storage system comprising such provided back-up ring, and a method of sealing a connection in a high pressure hydrogen storage system using such provided back-up ring.

Back-Up Ring

Figure 1A:
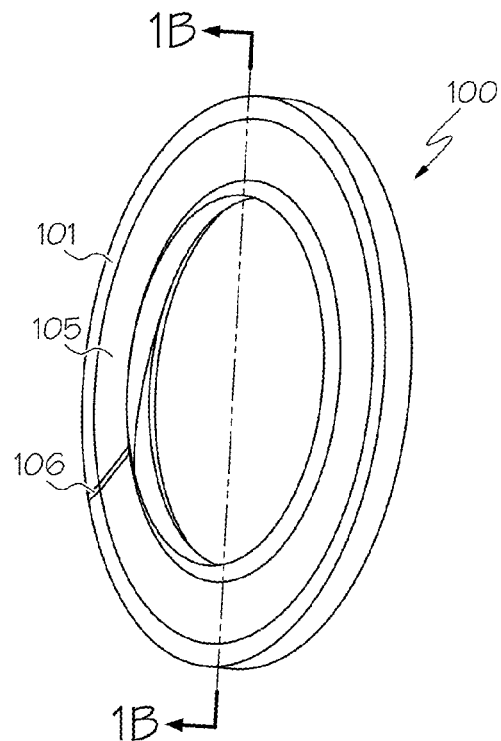
FIG. 1 illustrates one example of a provided back-up ring, wherein A is a top view of a back-up ring that is configured to be placed adjacent to and engage an O-ring; and B depicts a cross-sectional view of such back-up ring along line B-B, wherein the base portion and flange portions can be more readily observed.
Figure 1B:
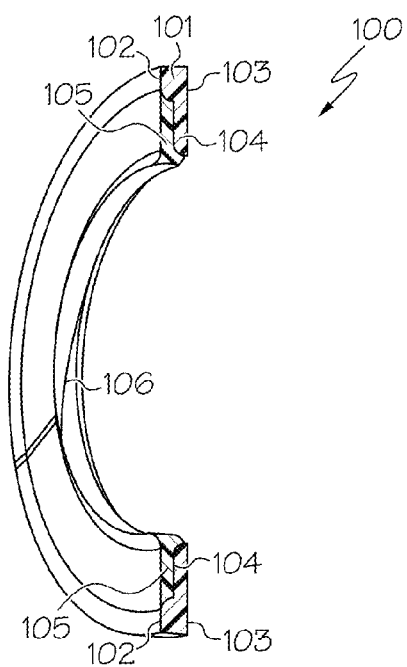

In some of the various embodiments disclosed herein, provided is a back-up ring for use with an O-ring to form a seal between first and second connector bodies, wherein the provided back-up ring comprises a base portion and a flange portion. The base portion comprises (i) a proximate face configured to engage an O-ring; (ii) an opposing distal face; and (iii) an inner face (or inner circumference) configured to engage an inner surface (or inner circumference) of a groove of a connector body. The flange portion is disposed on the inner and proximate faces of the base portion, and the flange is configured to engage an O-ring. To better illustrate embodiments of the provided back-up ring, reference is made to FIG. 1. As shown, the depicted back-up ring 100 comprises a base portion 101 having a proximate face 102, an opposing distal face 103, and an inner face 104. The proximate face 102 is configured to engage an O-ring (not shown), the distal face 103 is configured to engage a side of a groove (not shown) in a first connector body, and the inner face 104 is configured to engage a circumference (or inner surface) of such groove (not shown). To prevent extrusion of an O-ring into any gap that may exist between the inner face 104 and the circumference of such groove, the back-up ring 100 further comprises a flange portion 105 disposed on the inner 104 and proximate faces 102 of the base portion 101. As shown, the back-up ring 100 is discontinuous, having a cut 106 through the base 101 and flange 105 portions.

While the base portion 101 and flange portion 105 may be of unitary construction, practically they may also be separate components that are bonded together. Such bonding may be through mechanical, chemical, or other means. For example, the flange portion 105 may be bonded to the base portion 101 through use of adhesives, heat, or a combination thereof. In certain embodiments, the base portion 101 and flange portion 105 are constructed of different materials, wherein the selection of material will depend on the particular application. In such embodiments, the base portion 101 is typically constructed of a relatively stiff material, whereas the flange portion 105 is constructed of a relatively flexible material. The flange portion 105 should be flexible enough to seal between the back-up ring 100 and groove inner surface under the operating conditions of the seal. Therefore, among other considerations, the material chosen must be suitable for use within the operating temperature range of the system. As non-limiting examples, it is contemplated that the base portion 101 may be constructed of materials selected from poly ether ether ketone (PEEK); polytetrafluoroethylene (PTFE); ultra-high molecular weight polyethylene (UHMW-PE); and other relatively stiff materials, whereas the flange portion 105 may be constructed of materials selected from acrylonitrile-butadiene (NBR); fluorocarbon (FKM); thermoplastic polyurethane; and rubbers, such as ethylene propylene diene monomer rubber (EPDM), chloroprene rubber (CR), butyl rubber (IIR), and silicone rubber. One of skill in the art will, however, appreciate that other materials of construction are also contemplated. In some embodiments, the flange portion 105 may be constructed of the same material as an O-ring chosen for use with the provided back-up ring. In some embodiments, the flange portion 105 may be constructed of a material that is harder than the selected O-ring.

Without regard to the specific materials of construction chosen, the provided back-up rings are configured to engage an O-ring and cooperatively form a seal between a first and a second connector body. Typically, the first connector body comprises a groove into which the O-ring and back-up ring are at least partially seated. More particularly, the O-ring and back-up ring are disposed into a groove formed within the outer circumference of the first connector body, and the second connector body is disposed around the first connector body, O-ring and back-up ring, thereby forming a seal. However, unlike conventional back-up rings, the provided back-up ring is configured to prevent (i) extrusion of the O-ring into a gap that may exist between the first and second connector bodies; and (ii) extrusion of the O-ring into a gap that may exist between the inner face (or inner circumference) of the back-up ring and the groove inner circumference (or inner surface). Because it is designed to prevent two types of O-ring extrusion, the provided back-up ring is suitable for preventing, or at least reducing, the types of O-ring wear encountered in 70 MPa hydrogen storage systems. While particularly applicable for use with such systems in fuel cell and hybrid vehicles, one of skill will recognize that the present disclosure is not limited to such systems. For example, the provided back-up rings may also be suitable for use in watercraft, aircraft, spacecraft, high pressure industrial systems, and stationary power applications.

High Pressure Gas Storage System

Figure 2:
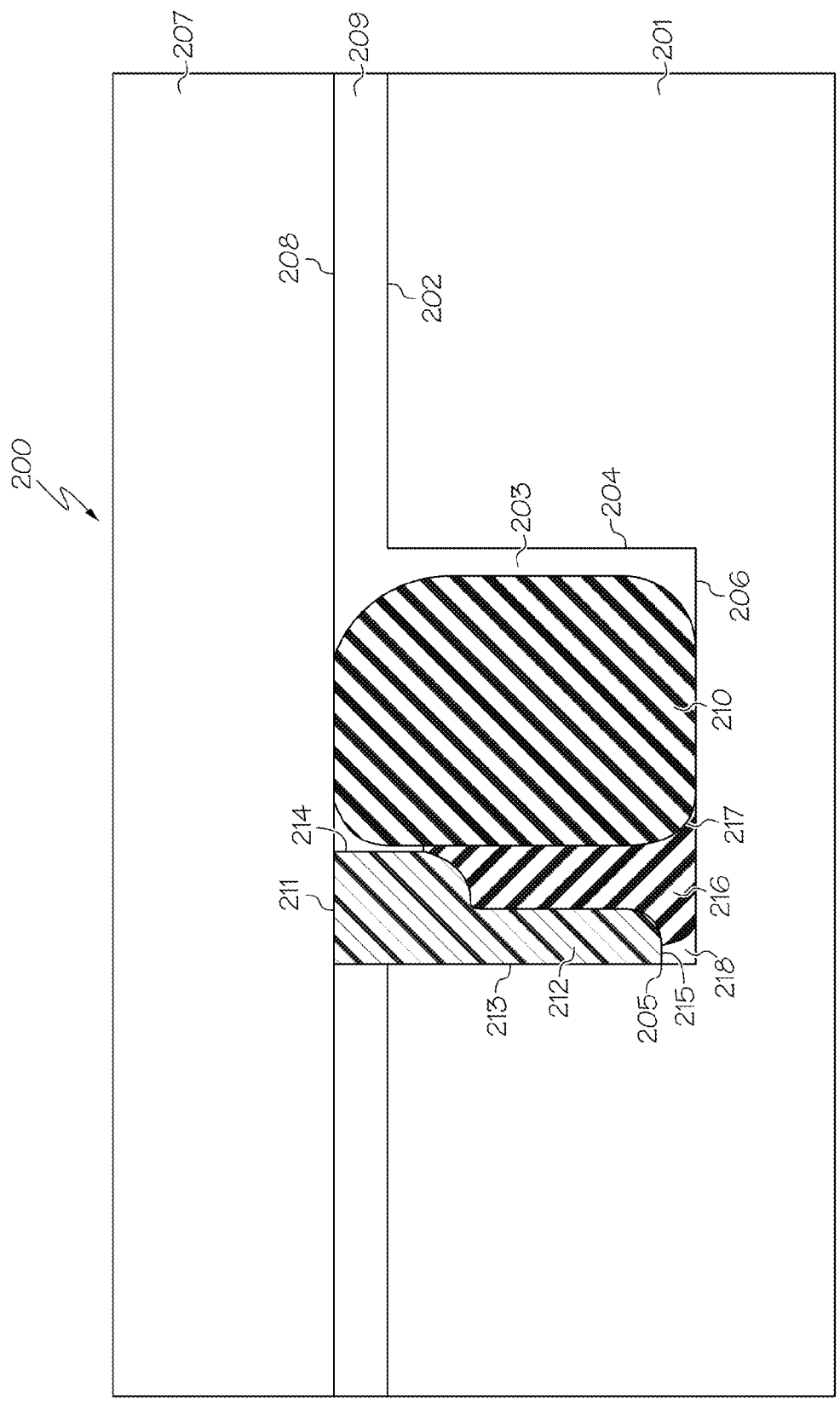
FIG. 2 illustrates one example of a provided O-ring/back-up ring sealing system for sealing between two connector bodies while controlling two types of O-ring extrusion.
Figure 3A:
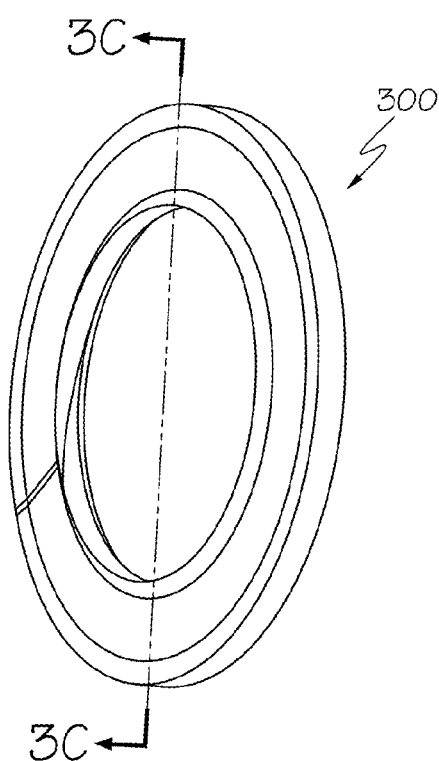
FIG. 3 illustrates another example of a provided back-up ring, wherein A and B show perspective views thereof, C depicts a cross-sectional view of such back-up ring along line C-C, and D illustrates certain separated components of such back-up ring.
Figure 3B:
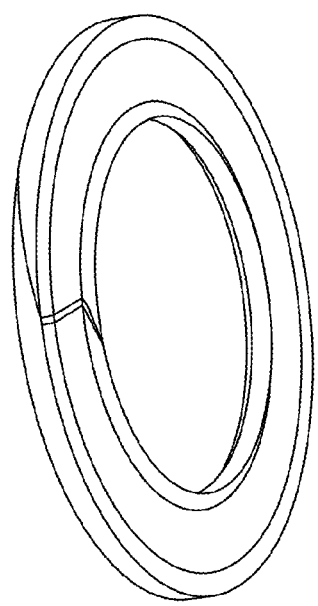
Figure 3C:
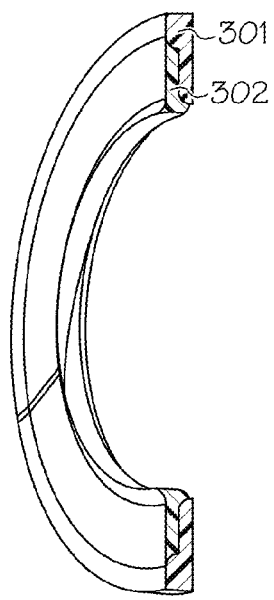
Figure 3D:
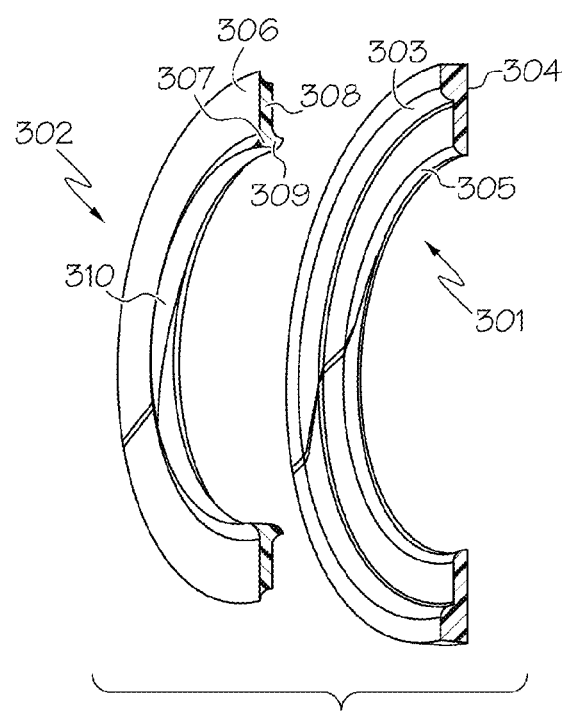

In some of the various embodiments, also provided is a high pressure gas storage system comprising a provided back-up ring. In some embodiments, such system may be a 35 MPa or 70 MPa hydrogen storage system for fuel cell or hybrid vehicles. To further illustrate embodiments of such system and the provided back-up ring, reference is made to FIG. 2, which depicts a cross-section of a portion of a sealed system. As shown, the system 200 comprises a first connector body 201 having an outer circumference 202 comprising a groove 203. The body 201 may be, but is not required to be, cylindrical. The groove 203 comprises a proximate side 204 which is closest to a source of high pressure flow (not shown). Additionally, the groove 203 comprises an opposing distal side 205 and an inner surface 206 disposed between the proximate 204 and distal 205 sides. The system 200 further comprises a second connector body 207 having an inner surface 208 configured to tightly encompass the outer circumference 202 of the first connector body 201. Accordingly, the inner surface 208 may be cylindrical. In the provided system 200, the first 201 and second 207 connector bodies may be portions of a pressure regulator, an excess flow limiter, a shut-off valve, a check valve, a flow valve, or a pipe fitting. As one of skill in the art will appreciate, a gap 209 may exist between the first 201 and second 207 connector bodies due to, among other things, manufacturing tolerances.

In the provided system 200, an O-ring 210 is at least partially disposed within the groove 203. As one of skill in the art will appreciate, the dimensions of the O-ring 210 used will depend upon the particular application. Accordingly, factors including circumference of the groove inner surface 206, outer circumference 202 of the first connector body 201, and gap 209 size may be considered. One of skill will also appreciate that the material of construction of the O-ring 210 used will also depend upon the particular application. Non-limiting examples of contemplated materials of O-ring 210 construction include nitriles, such as acrylonitrile-butadiene (NBR), hydrogenated nitrile (HNBR), and carboylated nitrile (XNBR); rubbers, such as ethylene propylene diene monomer (EPDM), ethylene propylene rubber, chloroprene rubber (CR), butyl rubber (IIR), and silicone rubber; fluorocarbon (FKM); fluorosilicone (FVMQ); perfluoroelastomer (FFKM); tetrafluoroethylene-propylene (FEPM); ethylene acrylate (AEM); polyacrylate; and thermoplastic polyurethane.

In high pressure applications, it is not uncommon for an O-ring to extrude into a gap existing between first and second connector bodies. To prevent this, the provided system 200 further comprises a back-up ring 211 at least partially disposed within the groove 203. The provided back-up rings 211 are preferably discontinuous rings, thereby enabling them to be around the outer circumference 202 of the first connector body 201 and into the groove 203 during assembly. The provided back-up ring 211 has (i) a base portion 212 comprising (a) a distal face 213 configured to engage the groove distal side 205; (b) an opposing proximate face 214 configured to engage the O-ring 210; and (c) an inner face 215 configured to engage the groove inner surface 206; and (ii) a flange portion 216 disposed on the inner 215 and proximate 214 faces. The flange portion 216 comprises a lip 217 that engages the O-ring 210. With automotive high pressure hydrogen storage systems, it has been discovered that O-rings can extrude into a gap 218 existing between the inner face (or inner circumference) of a conventional back-up ring and the groove inner surface (or inner circumference). Unlike conventional back-up rings, the provided back-up ring 211 is configured to engage the O-ring 210 and cooperatively form a seal between the first 201 and second 207 connector bodies and, when exposed to a positive pressure, prevent (i) extrusion of the O-ring 210 into a gap 209 between the first 201 and second 207 connector bodies; and (ii) extrusion of the O-ring 210 into a gap 218 between the inner face 215 of the back-up ring 211 and the groove inner surface 206.

To further illustrate embodiments of the provided back-up ring, reference is made to the exemplary ring depicted in FIG. 3. As shown, the ring 300 has separate base 301 and flange 302 portions that are bonded together, as shown in A-C. To further illustrate certain aspects of such ring 300, D depicts the base 301 and flange 302 portions as separated. The base portion 301 comprises a proximate face 303, an opposing distal face 304, and an inner face 305. The flange portion 302 comprises a proximate face 306, a proximate lip 307, a distal face 308, a distal lip 309, and an inner face 310. The proximate face 306 and proximate lip 307 of the flange portion 302 are configured to engage an adjacent O-ring (not shown). The distal face 308 is configured to engage the proximate face 303 of the base portion 301, and the distal lip 309 is configured to engage at least a portion of the inner face 305 of the base portion 301. The inner face 310 of the flange portion 302 is configured to engage a circumference (or inner surface) of a groove (not shown) in a connector body (not shown) and, in combination with the proximate 307 and distal 309 lips, prevent extrusion of an adjacent O-ring (not shown) into any gap that may exist between the inner face 305 of the base portion 301 and such groove circumference or inner surface.

Methods of Sealing a Connection

In some of the various embodiments, additionally provided are methods of sealing a connection in a high pressure hydrogen storage system using a provided back-up ring. Such system may be a 35 MPa or 70 MPa hydrogen storage system for fuel cell or hybrid vehicles. The method comprises providing a first connector body having an outer circumference comprising a groove, wherein said groove comprises (i) a side proximate to a source of high pressure; (ii) an opposing distal side, and (iii) an inner surface disposed therebetween. The method further comprises providing a second connector body having an inner surface configured to tightly encompass the outer circumference of the first connector body. The first and second connector bodies may be portions of a pressure regulator, an excess flow limiter, a shut-off valve, a check valve, a flow valve, or a pipe fitting.

The method also comprises providing an O-ring at least partially disposed within the groove of the first connector body. Typically, the O-ring is stretched over the outer circumference of the first connector body and is disposed into the groove. The materials of construction and dimensions of the provided O-ring will depend upon the particular application, taking into account factors such as circumference of the groove inner surface, outer circumference of the first connector body, and size of the gap between the first and second connector bodies. Non-limiting examples of O-ring materials of construction include nitriles, such as acrylonitrile-butadiene (NBR), hydrogenated nitrile (HNBR), and carboylated nitrile (XNBR); rubbers, such as ethylene propylene diene monomer (EPDM), ethylene propylene rubber, chloroprene rubber (CR), butyl rubber (IIR), and silicone rubber; fluorocarbon (FKM); fluorosilicone (FVMQ); perfluoroelastomer (FFKM); tetrafluoroethylene-propylene (FEPM); ethylene acrylate (AEM); polyacrylate; and thermoplastic polyurethane.

The method further comprises providing a back-up ring at least partially disposed within the groove. Typically, the back-up ring is discontinuous, thereby facilitating its placement around the outer circumference of the first connector body and its disposition into the groove adjacent the O-ring such that the O-ring remains closer to the source of pressure. Preferably, the back-up ring is discontinuous (or "cut") at an angle of from 12°-20°. However, other angles from ranging from 10° to 90° are also contemplated. While discontinous back-up rings are preferred, continuos rings are also contemplated. One of skill will recognize, however, that such a ring would require relatively more flexible and resilient materials of construction in order to enable stretching over the outer circumference of the first connector body. Use of a discontinous ring enables use of stiffer materials of construction.

The provided back-up ring comprises (i) a base portion comprising (a) a distal face configured to engage the distal size of the groove; (b) an opposing proximate face configured to engage the O-ring; and (c) an inner face configured to engage the groove inner surface; and (ii) a flange portion disposed on the inner and proximate faces. While the base portion and flange portion may be of continuous construction, in certain embodiments, the base portion and flange portion may be of discontinuous construction wherein the flange portion is bonded to the base portion through mechanical or chemical means. Examples of such bonding include adhesives, heat, or a combination thereof. In such embodiments, the base portion is typically constructed of a relatively stiff material, whereas the flange portion is constructed of a relatively flexible material. As non-limiting examples, it is contemplated that the base portion may be constructed of materials selected from nitriles, poly ether ether ketone (PEEK); polytetrafluoroethylene (PTFE); ultra-high molecular weight polyethylene (UHMW-PE); polyurethane; fluorocarbon (FKM); and other relatively stiff materials. It is also contemplated that the flange portion may be constructed of materials selected from nitriles; acrylonitrile-butadiene (NBR); fluorocarbon (FKM); thermoplastic polyurethane; and rubbers, such as ethylene propylene rubber, ethylene propylene diene monomer (EPDM), chloroprene rubber (CR), butyl rubber (IIR), and silicone rubber. One of skill in the art will, however, appreciate that other materials of construction are also contemplated.

The provided method further comprises assembling the first and second connector bodies, along with the O-ring and back-up ring, to form a sealed connection, and exposing the sealed connection to high pressure. For example, the sealed connection is exposed to pressures of at least 35 MPa or 70 MPa. The provided back-up rings are configured to engage the O-ring and cooperatively form a seal between the first and second connector bodies and, when exposed to such pressures, prevent (i) extrusion of the O-ring into a gap existing between the first and second connector bodies; and (ii) extrusion of the O-ring into a gap existing between the inner face of the back-up ring and the groove inner surface.

This application should not be considered limited to the specific figures and examples described herein, but rather should be understood to cover all aspects of the invention. Various modifications, equivalent processes, as well as numerous structures and devices to which the present disclosure may be applicable will be readily apparent to those of skill in the art. Those skilled in the art will understand that various changes may be made without departing from the scope of the invention, which is not to be considered limited to what is described in the specification.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the specification and appended claims, the singular forms "a," "an," and "the" are intended to include the plural forms as well, unless the context clearly indicates otherwise.

What is claimed is:

1. A high pressure gas storage system for automotive fuel cell applications wherein "high pressure" is defined as comprising operating pressures of at least 35 MPa, the storage system comprising:
   a first connector body having an outer circumference comprising a groove, the groove comprising (i) a side proximate to a source of high pressure of at least 35 MPa; (ii) an opposing distal side, and (iii) an inner surface disposed therebetween;
   a second connector body having an inner surface configured to tightly encompass the outer circumference of the first connector body;
   an O-ring at least partially disposed within the groove;
   a back-up ring at least partially disposed within the groove, the back-up ring having (i) a base portion comprising (a) a distal face configured to engage the groove distal side; (b) an opposing proximate face having a first segment configured to engage the O-ring; and (c) an inner face; and (ii) a flange portion disposed on the inner and proximate faces, wherein the base portion and the flange portion are constructed of different materials and the flange portion is relatively flexible compared to the base portion; further
   wherein the opposing proximate face of the base portion includes a second segment contiguous with the first segment, a third segment contiguous with the second segment, and a fourth segment contiguous with the third segment;
   wherein the flange portion includes a fifth segment configured to directly abut the second segment of the base portion;
   wherein the flange portion includes a sixth segment configured to directly abut the third segment of the base portion, the sixth segment being contiguous with the fifth segment;
   wherein the flange portion includes a seventh segment configured to directly abut the fourth segment of the base portion, the seventh segment being contiguous with the sixth segment;
   wherein the second and fourth segments of the base portion and the fifth and seventh segments of the flange portion are each substantially arcuate;
   wherein upon exposure to a positive pressure of at least 35 MPa, the back-up ring engages the O-ring to cooperatively form a seal between the first and second connector bodies, the O-ring and the flange portion; and
   wherein the back-up ring is configured to prevent (i) extrusion of the O-ring into a gap between the outer surface of the first connector body and the inner surface of the second connector body; and (ii) extrusion of the O-ring into a gap between the inner face of the back-up ring and the groove inner surface.

2. The storage system of claim 1, wherein the system is a 35 MPa or 70 MPa hydrogen storage system for fuel cell vehicles.

3. The storage system of claim 1, wherein the O-ring is constructed of a material selected from nitriles, such as acrylonitrile-butadiene, hydrogenated nitrile, and carboylated nitrile; rubbers, such as ethylene propylene diene monomer, ethylene propylene rubber, chloroprene rubber, butyl rubber, and silicone rubber; fluorocarbon; fluorosilicone; perfluoroelastomer; tetrafluoroethylene-propylene; ethylene acrylate; polyacrylate; and thermoplastic polyurethane.

4. The storage system of claim 1, wherein the base portion of the back-up ring is constructed of a material selected from nitriles, poly tetra fluoro ethylene; poly ether ether ketone; ultra-high molecular weight polyethylene; polyurethane; and fluorocarbon.

5. The storage system of claim 1, wherein the flange portion is constructed of a material selected from nitriles, acrylonitrile-butadiene, fluorocarbon, thermoplastic polyurethane, rubber, ethylene propylene rubber, ethylene propylene diene monomer, chloroprene rubber, butyl rubber, and silicone rubber.

6. The storage system of claim 1, wherein the flange portion of the back-up ring is bonded to the base portion of the back-up ring.

7. The storage system of claim 1, wherein the first and second connector bodies are portions of a pressure regulator, an excess flow limiter, a shut-off valve, a check valve, a flow valve, or a pipe fitting.

8. The storage system of claim 6, wherein the flange portion is bonded to the base portion by adhesive, heat, or combinations thereof.

9. The storage system of claim 1, wherein the back-up ring is discontinuous.

10. The storage system of claim 1, wherein a contour of the lip inversely corresponds to a contour of the O-ring such that the lip is a mating surface to the O-ring.

11. The storage system of claim 1, wherein an entire length of the flange portion facing the O-ring abuts the O-ring.

12. The storage system of claim 1, wherein:
the first segment of the base portion is substantially parallel to the third segment of the base portion.

13. The storage system of claim 1, wherein:
the sixth segment of the flange portion is substantially parallel to the third segment of the base portion.

14. The storage system of claim 1, wherein:
the flange portion and the base portion each define a respective inner diameter relative to a center of the back-up ring; and
the respective inner diameter of the flange portion is less than the respective inner diameter of the base portion.

15. The storage system of claim 1, wherein:
the flange portion includes a lip protruding towards the O-ring, the lip abutting the O-ring at the inner surface of the groove.

16. The storage system of claim 15, wherein:
the O-ring is configured to directly face the first segment of the opposing proximate face of the base portion; and
the O-ring is configured to directly face the lip of the flange portion.

* * * * *